United States Patent
Mendez

(10) Patent No.: US 10,331,820 B2
(45) Date of Patent: Jun. 25, 2019

(54) CUSTOM FABRICATION FROM GENERIC REVIT TEMPLATES

(71) Applicant: Applied Software Technology, Inc., Atlanta, GA (US)

(72) Inventor: Fausto Mendez, Phoenix, AZ (US)

(*) Notice: Subject to any disclaimer, the term of this patent is extended or adjusted under 35 U.S.C. 154(b) by 0 days.

(21) Appl. No.: 15/907,235

(22) Filed: Feb. 27, 2018

(65) Prior Publication Data

US 2018/0247002 A1    Aug. 30, 2018

Related U.S. Application Data

(60) Provisional application No. 62/465,149, filed on Feb. 28, 2017.

(51) Int. Cl.
*G06F 3/048* (2013.01)
*G06F 17/50* (2006.01)
*G06F 9/445* (2018.01)
*G06F 3/0481* (2013.01)
*G06F 8/38* (2018.01)
*G06F 3/0484* (2013.01)

(52) U.S. Cl.
CPC ...... *G06F 17/5009* (2013.01); *G06F 3/04815* (2013.01); *G06F 8/38* (2013.01); *G06F 9/44526* (2013.01); *G06F 3/04842* (2013.01); *G06F 2217/02* (2013.01); *G06F 2217/34* (2013.01)

(58) Field of Classification Search
CPC ...................................................... G06F 3/048
See application file for complete search history.

(56) References Cited

U.S. PATENT DOCUMENTS

| | | | |
|---|---|---|---|
| 2008/0275674 A1* | 11/2008 | Reghetti | G06F 17/5004 703/1 |
| 2010/0318929 A1* | 12/2010 | Hilton | G06F 3/0486 715/769 |
| 2015/0029181 A1* | 1/2015 | Lerey | G06T 19/003 345/419 |
| 2015/0234377 A1* | 8/2015 | Mizikovsky | G06F 17/5004 700/98 |

* cited by examiner

*Primary Examiner* — Xuyang Xia
(74) *Attorney, Agent, or Firm* — Clayton, McKay & Bailey, PC

(57) ABSTRACT

Systems and methods presented herein provide a plugin to REVIT or a similar program that allows the graphical user interface to convert system components to custom components and vice versa. This can include converting a system conduit pipe to multiple custom conduit pipes with a connector. It can also include converting a system first pipe, bend, and second pipe into a custom kick. The plugin can calculate an imaginary intersection point between first and second pipes in a plane. Using the calculated intersection point, the plugin can calculate actual pipe dimensions needed for fabricating the kick. The dimensions can be displayed within REVIT with a triangle generated to show the otherwise missing dimensions.

14 Claims, 8 Drawing Sheets

CUSTOM FABRICATION FROM GENERIC REVIT TEMPLATES

CROSS REFERENCE TO RELATED APPLICATIONS

This non-provisional patent application claims the benefit of priority to provisional patent application No. 62/465,149, filed Feb. 28, 2017, and entitled "CUSTOM FABRICATION FROM GENERIC REVIT TEMPLATES," which is expressly incorporated by reference herein.

BACKGROUND

AUTODESK REVIT is Building Information Modeling ("BIM") software that allows users to elaborately design three-dimensional structures. REVIT can be used to design complex buildings all the way down to components and assemblies for use in a project. For example, a user can model an entire plumbing or electrical installation within a building.

Using REVIT or similar BIM software, users can lay out electrical conduit or other construction components within a building plan. In particular, REVIT includes generic templates for conduit and other construction assemblies, allowing the designer to include the assemblies within the plan. Similarly, REVIT templates for conduit and other components, such as plumbing or air conditioning ducts, can allow a user to draw a long run and easily visualize where the components will go.

However, these templates are for visualization purposes only, and are not useful for fabrication. As an example, a long conduit run of 50 feet would appear to be one long piece of conduit based on the generic REVIT template. But in the real world, this same run would be broken into multiple connected pieces of conduit for cost savings and transportation feasibility. The exact number of pieces and lengths would depend on the real-world assembly being used. Similarly, bends in the conduit may be generically represented as curved single conduit without consideration for whether a kick piece or curved attachments to straight pieces are appropriate. The generic conduit templates in REVIT, therefore, are not appropriate for actual fabrication purposes.

The graphical user interface ("GUI") of existing BIM and REVIT systems does not allow a user to easily design with custom assemblies, such as plumbing or electrical assemblies. Existing GUIs allow a user to create or import custom components. A custom library of conduit parts with actual fabrication dimensions can be utilized. However, the GUI does not provide any easy way to convert a generic conduit layout into customized parts. Therefore, the user is stuck doing the same design twice. First, the user lays out the conduit with the design convenience of the generic REVIT templates. Then the user essentially redraws the conduit system by overlaying specific custom library components on top of the generic content. This is a waste of time. In addition, if the design changes, the user must painstakingly redraw the conduit run using the custom parts. Therefore, existing GUI limitations discourage design changes.

Existing GUIs present the same problem for other REVIT custom templates. For example, default REVIT plumbing and HVAC templates are also not useful for fabrication. The user is stuck with the existing GUIs because BIM and REVIT software dominates the market for construction design.

Therefore, a need exists for a system that modifies existing GUIs to easily convert between generic REVIT templates and custom fabrication-level content.

SUMMARY

The examples described herein specifically address technical problems and limitations of REVIT and similar BIM software. The examples include a plugin that operates within REVIT to convert between generic models and custom content.

On a GUI within REVIT, a user can select one or more system components. For example, the user can select a template electrical conduit assembly. The system component can have an insertion point, a length, and a direction. With the system component selected, the user can run a command in REVIT that calls a conversion subroutine in the plugin to enhance the GUI functionality. The plugin can determine the direction, the diameter, and the length of the system component. The direction can be based on an X-, Y-, and Z-axis. The plugin can also map custom family parameters to system family parameter to determine which custom components to substitute for the generic system component. This can allow the plugin to select one or more custom components and align them in the same direction. The custom components can then be displayed in the GUI in place of the system components.

In one example, the plugin determines that the system component length is greater than a custom components length. In response, the plugin can select at least two custom components and a custom connector. For example, a generic conduit can be 20 feet long. If the longest custom conduit is 10 feet, then plugin can choose two 10 foot custom conduit parts plus a connector.

The plugin can also replace the system component on the GUI with the chosen custom components. In one example, the custom components are color coded differently than the system components to allow the user to easily discern which components are in view. The color coding can be based on filters that apply differently to a system family than a custom family.

The conversion formula can also depend on the particular system components, including the type of conduit. For example, a kick can have two elbows and a pipe. The plugin can receive dimensions from REVIT. However, REVIT returns dimensions from the conduit to the bend, but not the imaginary intersection. Therefore, the plugin can calculate dimensions for that intersection, which can be important for fabrication and part ordering. The plugin can also identify the maximum length for a custom kick rather than a pipe with an elbow. If the maximum length is exceeded by the system component, then the plugin can pick a custom pipe with an elbow. Otherwise, the plugin can pick a custom kick.

The plugin can also convert the custom components back to system components. This can be useful for allowing a user to reroute components such as conduit or plumbing. Whereas the custom components can have fixed lengths (for fabrication purposes), the generic system components can be stretched and rerouted more easily. In one example, the user selects a group of custom components and selects an option to convert back to system components. In another example, when the user attempts to stretch or otherwise reroute a custom component, the plugin automatically converts the custom components to system components. After rerouting, the user can again convert back to custom components.

The custom components can allow the user to generate a bill of materials for both fabrication and pricing purposes. In one example, the bill of materials allows ordering of a custom kick that is already bent to specifications. This can avoid the difficult task of bending the kick on site.

Additionally, the plugin can display length data in the GUI for the custom components. This can include a length line for the actual length measurement of the kick (to the imaginary intersection).

Although REVIT is referred to throughout this disclosure, the examples apply to any BIM or computer-aided design ("CAD") program.

It is to be understood that both the foregoing general description and the following detailed description are exemplary and explanatory only and are not restrictive of the embodiments, as claimed.

BRIEF DESCRIPTION OF THE DRAWINGS

The accompanying drawings, which are incorporated in and constitute a part of this disclosure, illustrate various embodiments and aspects of the present invention. In the drawings.

DESCRIPTION OF THE EXAMPLES

Figure 1:
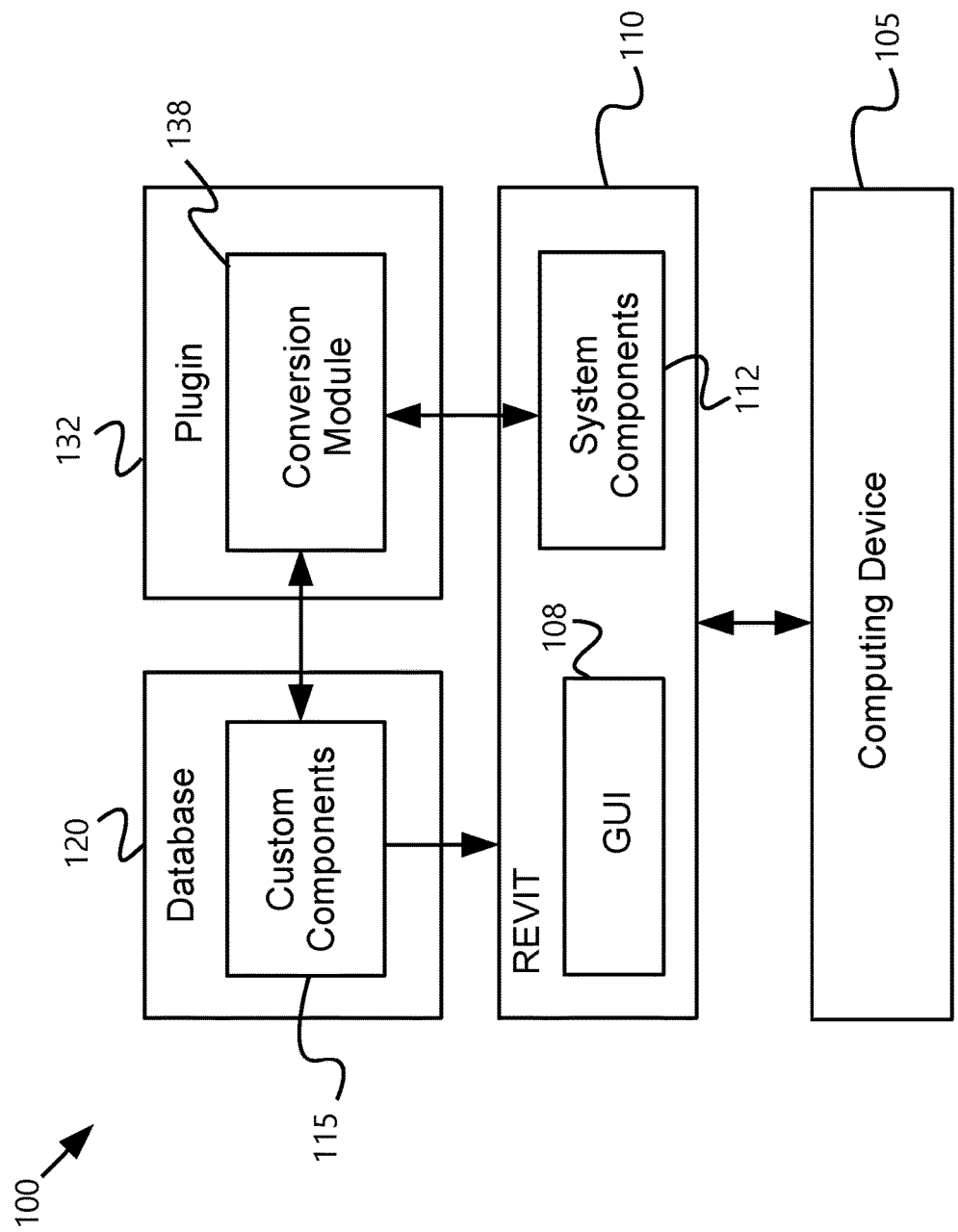
FIG. 1 is an exemplary illustration of system components for integrating nested assembly families with REVIT.

Reference will now be made in detail to the present exemplary examples, including examples illustrated in the accompanying drawings. Wherever possible, the same reference numbers will be used throughout the drawings to refer to the same or like parts. The described examples are non-limiting.

An improved user interface for computing devices can allow REVIT or another BIM software to convert system components to custom components. This can provide the user with flexibility that prior art systems do not possess, providing the flexibility of laying out, for example, conduit with system components, then converting to custom components. The system components can be stretched and easily reoriented because they are not fixed to a particular size. Once the system components are in place, the user can execute a command that causes the plugin to perform the conversion. This obviates the need to redesign assembly layouts for different custom components, such as when switching between different conduit providers or offerings.

To perform the conversion, the plugin can calculate the direction, size, and orientation of the system components that are laid out in the GUI. These calculations can be made relative to the current project view. Then, each system component is mapped to at least one custom component. The number of custom components can depend on the length, since each custom component has a fixed size or choice of fixed sizes. The custom components can be oriented with the same calculated direction and orientation. In this way, the method of conversion can rely on the raw data of REVIT or another BIM software but eliminate many complications inherent to converting to custom components in those applications.

In one example, the plugin can further determine true lengths of system components that have a bend between sections. In one example, this can allow the plugin to determine whether a first pipe, a bend, and a second pipe can convert into a custom kick component. Because REVIT does not provide true lengths to the point where the first and second pipes would intersect, the plugin calculates these lengths. These calculated lengths are then used to determine whether a custom kick can work, and then size and angle the custom kick correctly.

The plugin can be a DLL that loads within REVIT based on a set of hooks. This allows the plugin to interact with the REVIT project. The plugin can extend the functionality of REVIT using the hooks and through communicating with an application program interface ("API"). The plugin can alternatively operate with another BIM or CAD system. It can also be a separate application that interfaces with REVIT through an API. The plugin can execute to perform conversion between system and custom components or vice versa. The plugin can also execute to generate a dialog display in example.

The plugin can interact with REVIT to generate a bill of materials based on parameters of the custom components. In one example, the plugin can track component identifiers and generate the bill of materials based on those identifiers. In one example, the bill of materials can be generated in a dialog display, which can be a custom GUI screen generated by the plugin. The bill of materials can list the custom components, along with information such as part identifiers, prices, suppliers, and shipping information.

FIG. 1 includes an exemplary diagram of a system 100 in accordance with an example. REVIT 110 or another BIM program can execute on a computing device 105. The BIM program, such as REVIT 110, includes a GUI 108 used to create and display a design layout. Using REVIT 100, designers can create models of nearly any type of physical object, including dwellings and other structures. In one example, electrical, plumbing, or HVAC assemblies can also be designed. Although REVIT 110 is used as an example below, the disclosure applies to other BIM or CAD programs as well.

The computing device 105 can be any processor-based device, such as a personal computer, laptop, tablet, or cell phone. It can also include or be part of a server in one example. The computing device 105 can display the REVIT 110 GUI 108 by executing a set of instructions stored locally or remotely on a computer-readable medium. The computing device 105 can also execute the plugin 132 in one example. In another example, the plugin 132 can be an application that executes remotely on a server that is accessed by the computing device 105. The plugin 132 can be executed as part of REVIT 110 or another CAD or BIM application.

The plugin 132 can improve the GUI 108 of REVIT 110 or another BIM application. For example, the plugin 132 can allow the REVIT 110 GUI 108 to convert back and forth between system components and custom components. For example, a user can design a conduit layout using the convenient design flexibility of system REVIT 110 components. But these components are not fabrication level. For example, a user cannot directly buy the system components. They exist for layout and design purposes only. The user would still need to determine which physical components could work in a similar layout. This results in additional time and also design compromises. Once a design is in place, a user can be reluctant to change it because each change will require re-determining which physical components can work for the design.

To solve this problem, in one example, with a single command, the plugin can cause the system components to convert into fabrication-level components. As will be described, this can include picking optimal length components that fit together, as well as picking optimal component types, based on the system component layout.

In one example, a database 120 stores the custom components 115. The custom components 115 can include parameters used to ensure the sizing is accurate and that the components are directly usable for fabrication. For example, custom components 115 can include lengths, widths, bends, and connector information. Two pieces of conduit can be connected if they have compatible lengths, gauges, and connectors.

The database 120 can be implemented by any type of computing device. In one example, the database 120 is part of computing device 105. In another example, the database 120 is remotely accessible by the computing device 105, such as over a network. The network can be a local area network, an enterprise network, or the Internet. In one example, multiple computing devices 105 in an enterprise can remotely access the database 120 over the network. This can allow for centralized storage of the nested families 115 and 117, reducing storage for assemblies that can be loaded into a remotely executing REVIT application.

Using the API, REVIT 110 can execute custom methods for the plugin 132 when certain events occur within REVIT 110. Custom methods can include new procedures that are part of plugin 132. Events are generated when an action is submitted to a REVIT 110 server for performance by REVIT 110. The plugin 132 can implement the events to cause REVIT 110 to communicate with the plugin 132. The plugin 132 then can execute custom methods for customized functionality.

A first example of the customized functionality can be the conversion module 138. The conversion module 138 can perform the measurements and comparisons needed to pick the correct custom components 115 to replace system components and display them in the GUI 108. The conversion module 138 can likewise convert custom components 115 back into system components for the purposes of continued design flexibility.

A dialog display can be another example of customized functionality provided by the plugin 132. The dialog display can be a window or pane in the GUI 108 that displays a bill of materials or bill of sale comprised of the custom components 115. In one example, one or more hotkeys can be set to launch the dialog display. The bill of sale can populate by reading the attribute values of the custom components that are part of the project. A dialog display can also be used to receive user selections regarding which custom components 115 to use. For example, different brands, materials, and sizes of components can be selected as custom components 115. The user can define these preferences ahead of time, or at the time that the conversion is selected, depending on the example.

In one example, line measurements of the system components are calculated in order to convert to custom components. Line-plane intersection analysis can be used to determine the true length of pipes when a system component combination of a first pipe, a bend, and a second pipe is detected. The analysis can take into account the orientation of the system components 112 in the GUI 108.

To determine whether a custom kick can substitute for the system component combination, the plugin can determine lengths of the lines from the pipe endpoints to where they would intersect if not for the bend (e.g., an imaginary intersection point.) REVIT does not provide these lengths. Therefore, the plugin 132 provides specific methods of determining them for purposes of the conversion.

In one example, the conversion module 138 utilizes line intersection algorithms to determine the lengths. The line intersection algorithms can determine optimal part sizes and types, for example, when a conduit or plumbing line is designed with a bend. Two such line intersection algorithms are based on the graphical illustrations in FIGS. 2A, 2B, and 2C.

Figure 2A:
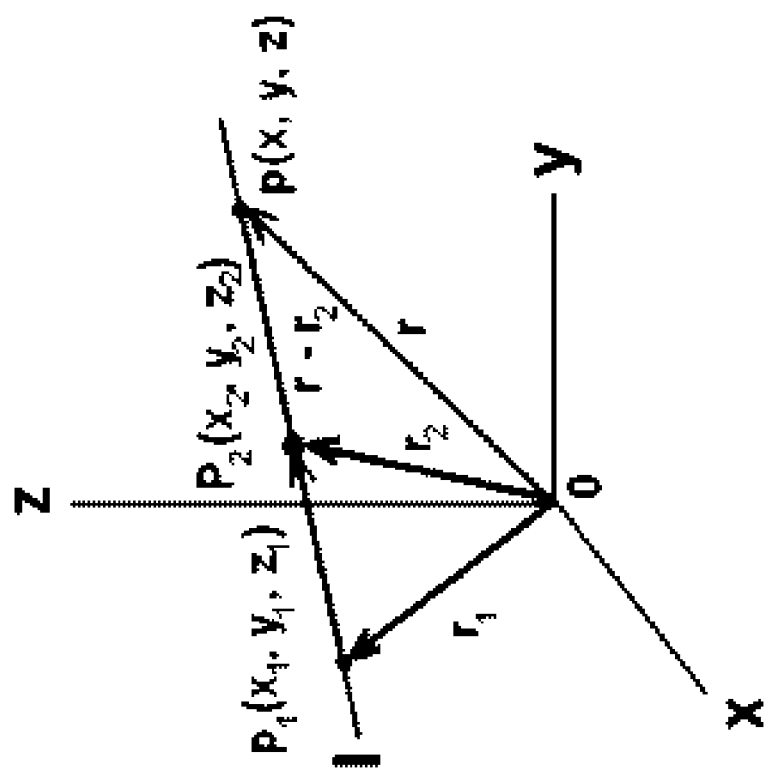
FIG. 2A illustrates an example vector calculation.

FIG. 2A is an example vector equation that can be used to calculate imaginary intersection points between two lines and the lengths of those lines to the imaginary intersection point. This can be used, for example, to determine a custom component such as a kick that can take the place of at least one straight system component and a bend. The plugin 108 can determine the equation of a line passing through two points $P_1(x_1, y_1, z_1)$ and $P_2(x_2, y_2, z_2)$, where $p(x, y, x)$ can be an imaginary point. The vector equation of the line is $r=r_2+t*a$, where $a=<(x_2-x_1), (y_2-y_1), (y_2-y_1)>$.

A rotation matrix or three-dimensional vector matrix can be used to compute the imaginary point of intersection. The examples are not limited based on the precise mathematical techniques used to perform the line calculations to solve for the lengths and intersection points. Although a CAD application such as REVIT is limited in that the GUI only calculates and shows lengths up to the bend, the plugin 108 can calculate the imaginary intersection point and then calculate the line length up to that imaginary intersection point.

Figure 2B:
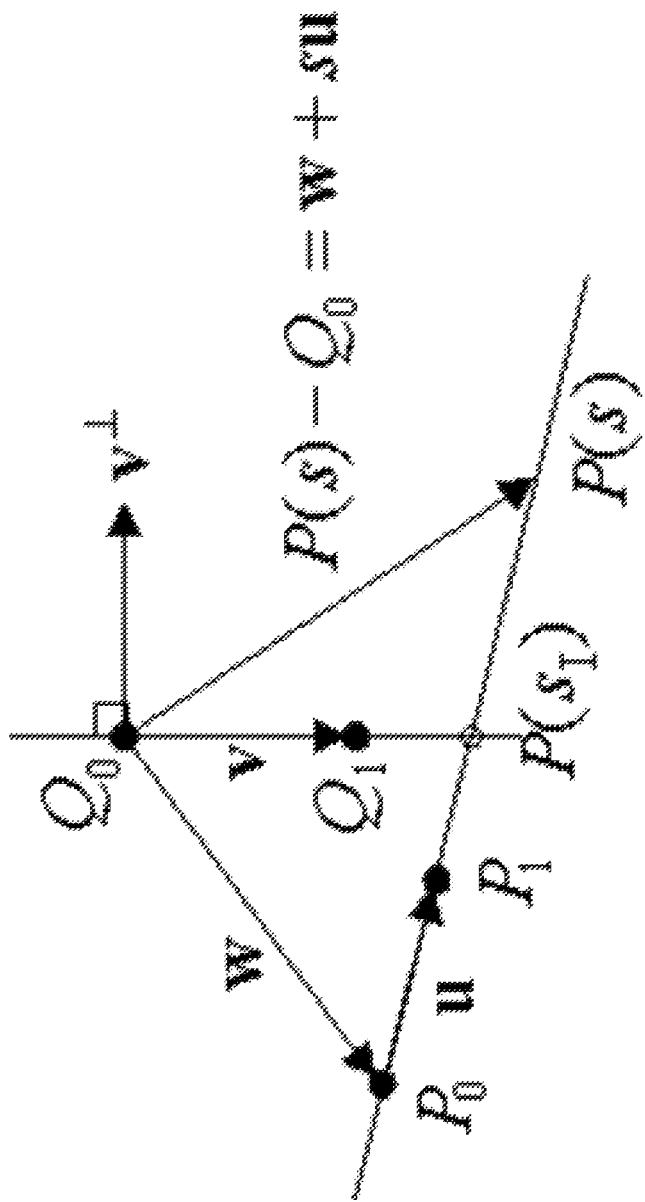
FIG. 2B illustrates an example vector calculation.

FIG. 2B includes a graphical illustration for determining a line intersection. Referencing that diagram, the algorithm can restrict to two coordinates, for which u and v are not parallel, compute the 2D intersection point I at $P(sI)$ and $Q(tI)$ for those two coordinates, and then test if $P(sI)=Q(tI)$ for all coordinates. To compute the 2D intersection point, consider the two lines and the associated vectors in FIG. 2B.

To determine $S_I$, the algorithm uses the vector equality $P(s)-Q_0=w+su$ where $w=P_0-Q_0$. At the intersection, the vector $P(s_I)-Q_0$ is perpendicular to $v^\perp$, and this is equivalent to the product condition that $v^\perp \cdot (w+s_I u)=0$. Solving this equation, the algorithm yields Equation 1, below.

$$s_I = \frac{-v^\perp \cdot w}{v^\perp \cdot u} = \frac{v_2 w_1 - v_1 w_2}{v_1 u_2 - v_2 u_1} \qquad \text{Equation 1}$$

3D plane analysis can also be used to determine intersections for some shapes. If the line and plane are not parallel, then L and P intersect in a unique point $P(sI)$ which is computed using a method similar to the one for the intersection of two lines in 2D.

Figure 2C:
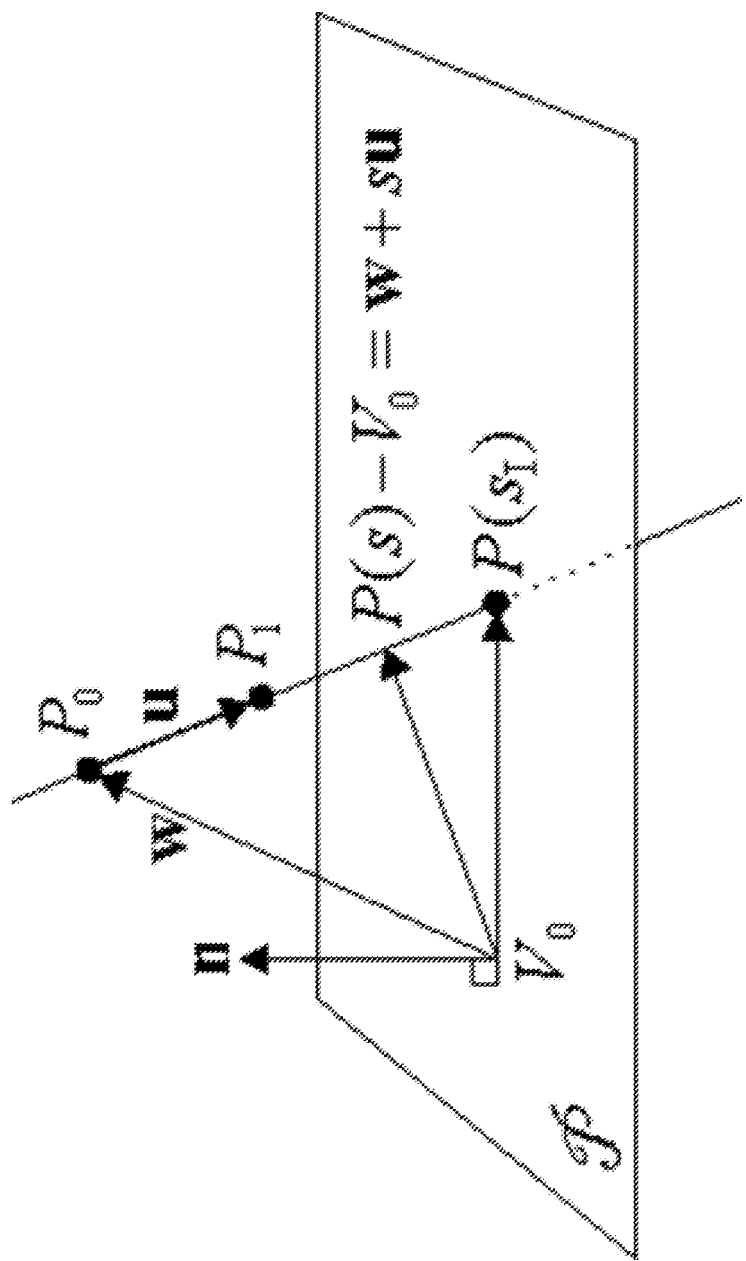
FIG. 2C illustrates an example vector calculation.

The diagram of FIG. 2C shows the calculations for a plane-line intersection, which can be used to predict the point where two generic lines would intersect in a plane. Fabricators need the imaginary point where the intersection would occur if there was no bend between the straight components. REVIT 110 does not do so, but the improved GUI 108 can determine the intersection, allowing users to use REVIT 110 for fabrication kick parts or other assemblies that include a bend. By determining this dimension, the plugin can pick appropriate custom fabrication parts. It can also provide an accurate bill of materials or bill of sale.

Figure 3A:
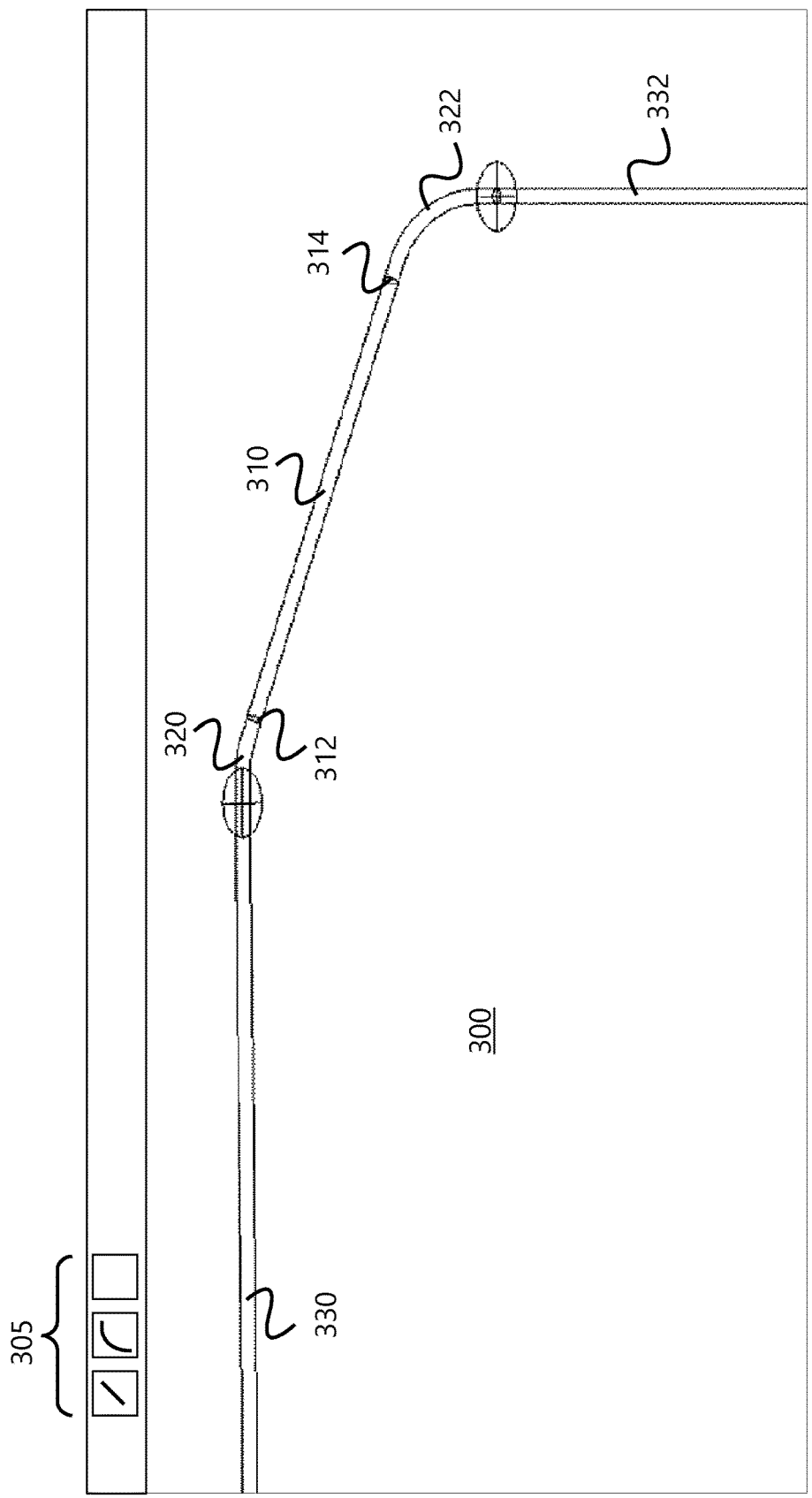
FIG. 3A illustrates exemplary an user interface.
Figure 3B:
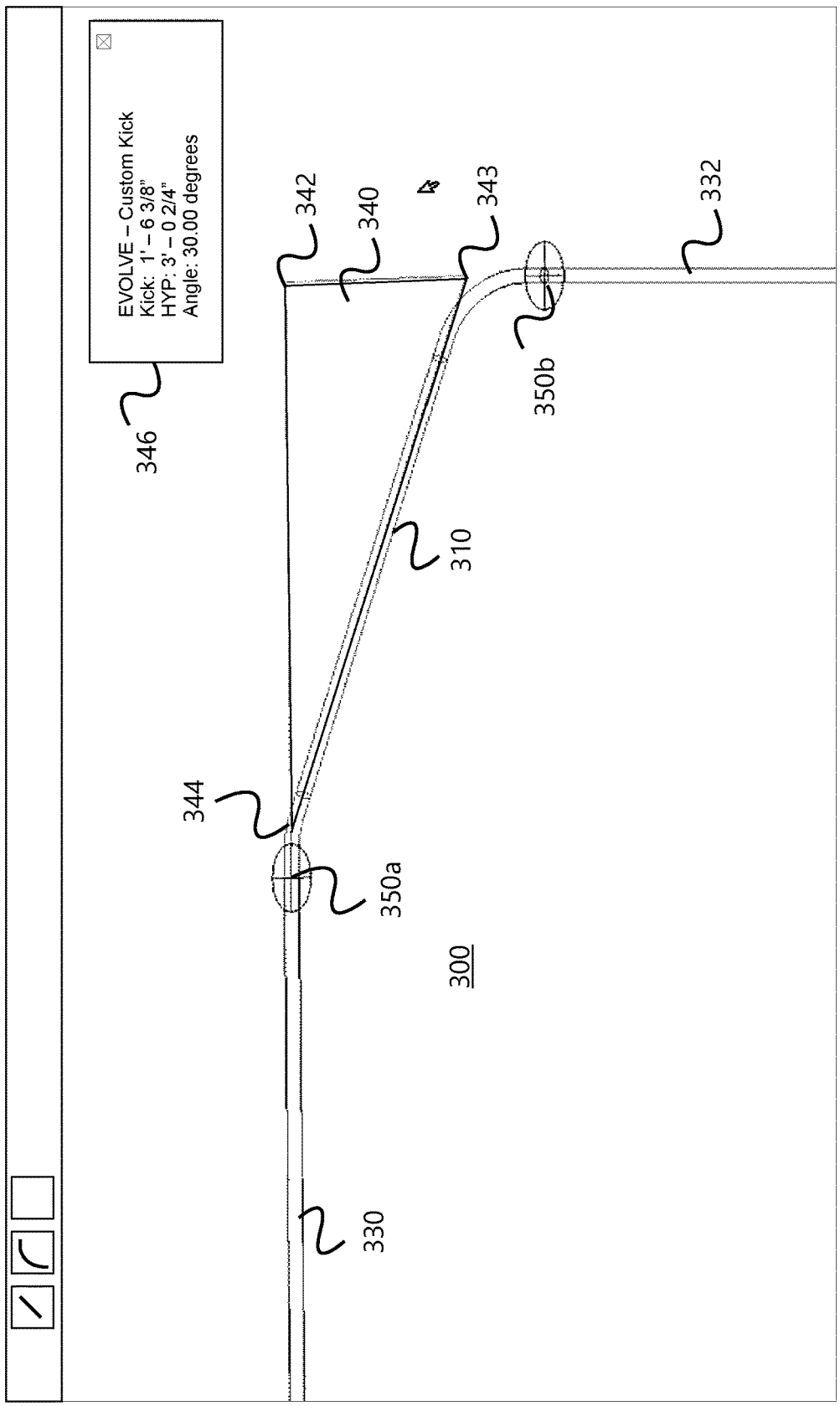
FIG. 3B illustrates exemplary an user interface.

FIGS. 3A and 3B illustration an example conversion. FIG. 3A shows system components including a first pipe, bend, and a second pipe. FIG. 3B shows the conversion, which substitutes a custom kick component in place of the system components. The dimensions of the kick are also illustrated, along with a triangle illustrating the imaginary intersection point. The dimensions are displayed in a separate box in this example. But dimensions can also be placed on the triangle.

FIG. 3A includes a GUI screen 300 where a user can draw system components onto the screen 300. The user can draw system conduit 310 by clicking a first point 312 and dragging the conduit 310 to a second point 314, establishing a length and direction of the system conduit 310. The points 312 can have an X, Y, and Z value. Similarly, system bends 320, 322 can be drawn into place on the GUI screen 300. Additional system conduit 330, 332 can be drawn to connect to the bends 320, 322. The GUI 108 can provide various tools 305 for drawing system conduit, system bends, and other features onto the GUI screen 300.

Using the GUI 108, the user can select one or more pieces of the system conduit 310, 320, 322, 330, 332. Then the user can execute a function to convert to custom components. This can include using a hotkey or selecting a button on the GUI 108 that is added based on the plugin 132 that extends the normal GUI 108 functionality. Alternatively, the function can be activated and then the conduit path selected, causing conversion module 138 to calculate dimensions for use in converting to custom components.

The conversion module 138 can calculate the points in the three-dimensional space for the selected system conduit 310, 320, 322, 330, 332, taking into account the view orientation. It can also calculate imaginary intersection points for conduit 310, 332 connected by a bend 322. This can allow the conversion module 138 to determine the correct conduit length, bend points, and angle used in selecting one or more components. This conversion module 138 can use the points to determine which custom components can be substituted in place of the selected system 310, 320, 322, 330, 332, and the lengths and sizes of those custom components. The custom components, such as conduit, can have various lengths, diameters, and flows available. Because the custom components correspond to actual parts that can be ordered, the dimensions can be limited to those that are commercially available.

The conversion module 138 can segment or join selected system conduit 310, 320, 322, 330, 332 to result in an efficient substitution of custom components. The efficiency can be based on fewest custom components, least amount of assembly needed, or cheapest price. The plugin 132 can take into account the direction, flow, and diameter of the conduit when choosing the custom components. For example, a "kick 90" component can include pipe and a bend in a single component. The kick can be pre-bent or bent on site, depending on the custom component. But the length of the pipe must take into account the bend. The length can be calculated by the conversion module 138. This can allow the GUI 108 to display an actual length for conduit to result in the correctly-sized kick, after bending.

The example of FIG. 3A can result in a conversion into a custom kick, which includes at least one straight portion and a bend. The conversion module 138 can also convert the system components into a "kick 90," which is a kick with two elbows. But the system can also detect simpler kicks with only one elbow. The middle system pipe 310 has a length that does not exceed the maximum length of conduit for a custom bend (between the two bends). In this example, the maximum length was not exceeded. The plugin 132 can also take into account the width of the conduit versus the bend radii. There is a minimum bend radii that applies to the particular pipe size. For example, a half inch conduit can be bent with a three-inch radius, but a three inch pipe could not be bent the same way without crinkling the pipe.

The rules for allowed bends can be stored in the database 120 as part of the custom component data 115. Pipe material and thickness can correspond to allowed bend radii. The conversion module 138 can use these rules to determine which custom components can substitute in place of the system components, including whether a separate bend piece is needed or whether a single kick piece can be used for a straight pipe with one or more bends.

As part of the conversion, the plugin 132 can cause the GUI 108 to display a triangle 340 that shows the imaginary intersection point 342 of the straight components 330, 332. In fact, the triangle 340 can be based on three different intersection points 342, 343, 344 calculated by the conversion module 138 that represent all the intersections of the selected system conduit path.

The GUI 108 can also display dimensions 346 of the custom kick defined from points 340a to 340b. In this example, the dimensions are for a kick 90 having a length of 1 foot and 6 and ⅜ inches, hypotenuse of 3 feet and a half inch, and an angle of 30 degrees. These dimensions can be both determined and used by the conversion module 138 to select the correct custom kick that is either pre-bent or marked for bending in the field.

The custom components selected can be based on preferences preselected in the GUI 108 by the user. For example, the user can specify a particular brand or supplier, component thickness, material, maximum and minimum lengths, and other attributes. These can all be used by the conversion module to eliminate potential custom component and pick those that meet the user criteria.

The GUI 108 can allow the user to copy, paste, and move the custom components. To stretch or otherwise re-dimension the custom components, the conversion module 138 can be invoked to convert the custom components back into system components. The user can then draw or alter the conduit (or plumbing, HVAC, pipe for hydronics, etc.) path as desired using the GUI 108. Then the conversion module 138 can convert the system components into custom components (which can be a different set of custom components that previously, based on the redesign).

Figure 4:
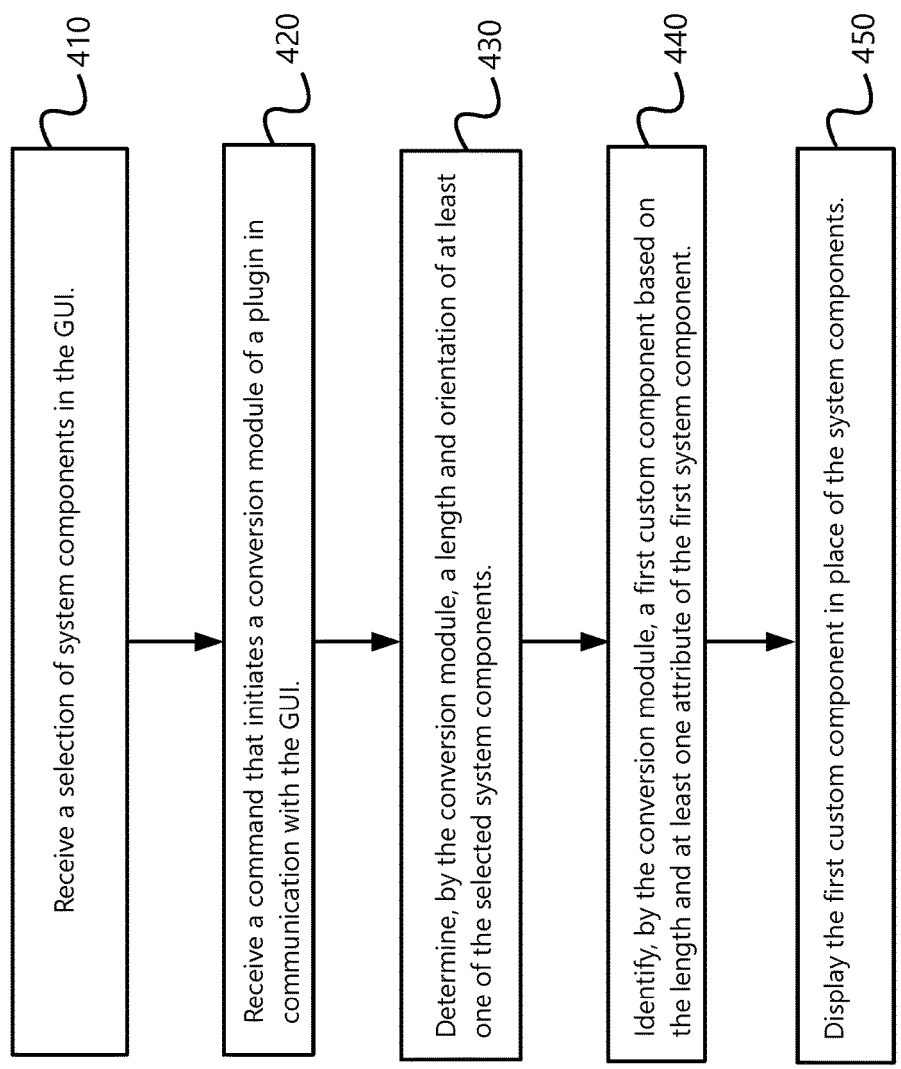
FIG. 4 is an exemplary flow chart.

Turning to FIG. 4, an example process for conversion between system components and custom components is illustrated.

At stage 410, the GUI 108 receives a selection of system components. This can include selecting one or more pipes and bends. Alternatively, it can include selecting HVAC ducting, conduit, electrical assemblies, hydronics, or other mechanical components. The selection can be done by clicking on system components or dragging a box around one or more components. In one example, clicking on a single component can also cause selection of all connected components in a single run.

At stage 420, the GUI 108 receives a command that initiates a conversion process of the plugin. This can be a hotkey command, button, or a menu selection. In one example, the user activates a conversion option that causes the plugin 132 to automatically convert all subsequently selected system components. In that example, stage 410 can occur after stage 420.

The conversion can apply to the selected system components. The conversion can be broken into multiple steps in an example, including (1) calculation of dimensions such as lengths, intersection points, and orientation; (2) use of the calculated dimensions and custom component attributes to select corresponding custom components; and (3) display of the custom components in place of the system components within the GUI 108.

At stage 430, the plugin 132 determines a length and orientation of a first of the system components. This can be done for each selected system component. In addition, this can include calculation the imaginary intersection point(s) based on the plane intersection with a line algorithm, such as those of FIGS. 2A and 2B, to determine if more complex custom components can be substituted in place of the system components. For example, if the geometry of the selected components indicates three imaginary intersection points 342, 343, 344 in a plane, the plugin 132 can draw a triangle 340 in the GUI 108. The plugin 132 can do so by accessing an application programming interface ("API") or hooks available at the GUI 108 to cause the GUI 108 to draw the additional graphics. The triangle 340 dimensions 346 can be used by the plugin 132 at stage 340 to determine if a kick or other custom component with bends should be substituted in place of the selected system components.

In one example, the plugin 132 can cause the GUI 108 to display the dimensions 346 of the lines that intersect at the imaginary intersection point. These dimensions 346 can be displayed in a box or can be displayed next to the lines or angles to which the dimensions 346 apply. The user can drag, copy, or delete the triangle 340 and dimensions 346 as any other normal object within the GUI 108. Additionally, the triangle 340 and dimensions can change with orientation changes of the view. In other words, the orientation can be determined with respect to the current view of the GUI 108. This orientation information can be retrieved using the REVIT API, in one example.

At stage 440, the plugin identifies a first custom component based on the length and at least one attribute of the first system component. This can include comparing lengths, orientations, and system component types to a database of custom components. The custom components can have finite size options that the plugin can determine meet or do not meet the lengths and orientations of the selected system components. If max lengths are exceeded, the plugin can select multiple custom components and a connector to join those components while maintaining the shape or path of the system components.

For a kick component, the plugin 132 can check rules in the database 120 regarding what bend angles are available for various pipe thicknesses and materials. If the rules indicate that the bend angle is acceptable and the length maximum has not been exceeded, the plugin can substitute a custom kick in place of system pipes and bends.

At stage 450, the plugin causes the GUI 108 to display the first custom component in place of the system components. This can include deleting the system component or setting attributes that cause it to be hidden and temporarily non-selectable. If the plugin 132 later converts back from custom components to system components, the hidden system components can be revealed and the custom components deleted, all by the plugin without the user having to manually perform all of these tasks within the GUI 108.

Alternatively, if the system components are deleted, converting back can still be accomplished based on similar stages performed in reverse to substitute new system components in place of the custom components. In particular, the plugin 132 can use length, orientation, and component types to select comparable system components. This can give the user flexibility to continue designing with the default system components before converting back again to fabrication components.

Figure 5:
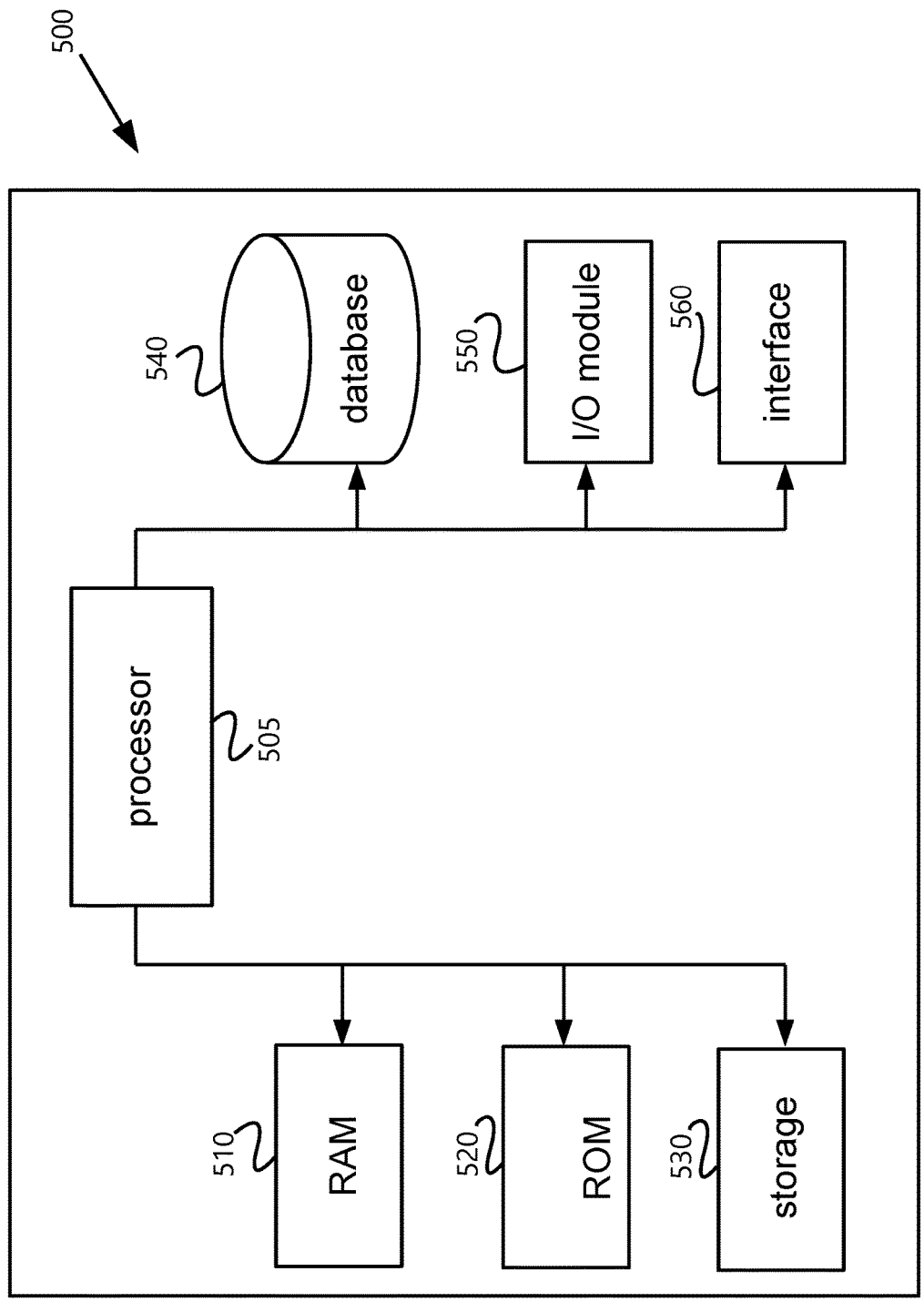
FIG. 5 illustrates exemplary system components.

FIG. 5 depicts an exemplary processor-based computing system 500 representative of the type of computing device 105 of FIG. 1. Continuing with FIG. 5, the computing system 500 is exemplary only and does not exclude the possibility of another processor- or controller-based system being used in or with one of the aforementioned components. Additionally, a server or other computing device 105 need not include all the system hardware components in an embodiment.

In one aspect, system 500 may include one or more hardware and/or software components configured to execute software programs, such as software for storing, processing, and analyzing data. For example, system 500 may include one or more hardware components such as, for example, processor 505, a random access memory (RAM) module 510, a read-only memory (ROM) module 520, a storage system 530, a database 540, one or more input/output (I/O) modules 550, and an interface module 560. Alternatively and/or additionally, system 500 may include one or more software components such as, for example, a computer-readable medium including computer-executable instructions for performing methods consistent with certain disclosed embodiments. It is contemplated that one or more of the hardware components listed above may be implemented using software. For example, storage 530 may include a software partition associated with one or more other hardware components of system 500. System 500 may include additional, fewer, and/or different components than those listed above. It is understood that the components listed above are exemplary only and not intended to be limiting.

Processor 505 may include one or more processors, each configured to execute instructions and process data to perform one or more functions associated with system 500. The term "processor," as generally used herein, refers to any logic processing unit, such as one or more central processing units (CPUs), digital signal processors (DSPs), application specific integrated circuits (ASICs), field programmable gate arrays (FPGAs), and similar devices. As illustrated in FIG. 5, processor 505 may be communicatively coupled to RAM 510, ROM 520, storage 530, database 540, I/O module 450, and interface module 560. Processor 505 may be configured to execute sequences of computer program instructions to perform various processes, which will be described in detail below. The computer program instructions may be loaded into RAM for execution by processor 505.

RAM 510 and ROM 520 may each include one or more devices for storing information associated with an operation of system 500 and/or processor 505. For example, ROM 520 may include a memory device configured to access and store information associated with system 500, including information for identifying, initializing, and monitoring the operation of one or more components and subsystems of system 500. RAM 510 may include a memory device for storing data associated with one or more operations of processor 505. For example, ROM 520 may load instructions into RAM 510 for execution by processor 505.

Storage 530 may include any type of storage device configured to store information that processor 505 may need to perform processes consistent with the disclosed embodiments.

Database 540 may include one or more software and/or hardware components that cooperate to store, organize, sort, filter, and/or arrange data used by system 500 and/or processor 505. For example, database 540 may include user-specific information, including password information, along with the custom objects and customization data. Alternatively, database 540 may store additional and/or different information. Database 540 may also contain a plurality of databases that are communicatively coupled to one another and/or processor 505, which may be one of a plurality of processors utilized by server 530.

I/O module 550 may include one or more components configured to communicate information with a user associated with system 500. For example, I/O module 550 may include a console with an integrated keyboard and mouse to allow a user to input parameters associated with system 500. I/O module 550 may also include a display including a graphical user interface (GUI) for outputting information on a monitor. I/O module 550 may also include peripheral devices such as, for example, a printer for printing information associated with system 400, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 560 may include one or more components configured to transmit and receive data via a communication network, such as the Internet, a local area network, a workstation peer-to-peer network, a direct link network, a wireless network, or any other suitable communication platform. For example, interface 560 may include one or more modulators, demodulators, multiplexers, demultiplexers, network communication devices, wireless devices, antennas, modems, and any other type of device configured to enable data communication via a communication network.

Other embodiments of the invention will be apparent to those skilled in the art from consideration of the specification and practice of the invention disclosed herein. It is understood that the examples can operate as an application or plugin with REVIT or any other BIM or CAD program. Also, the terms part, component, and assembly are used interchangeably. It is intended that the specification and examples be considered as exemplary only, with a true scope and spirit of the invention being indicated by the following claims.

What is claimed is:

1. A system of converting computer-aided design ("CAD") system components into custom components, including:
    a database that stores the custom components;
    a processor that executes a CAD application, the processor performing stages comprising:
        displaying a graphical user interface ("GUI") that allows a user to place the system components onto a screen;
        running a plugin that determines coordinates related to selected system components in the GUI;
        receiving a command from the user that initiates a conversion module of the plugin, wherein the conversion module at least:
            determines a length and orientation of a first of the selected system components, wherein the system components include a first pipe, a bend, and a second pipe;
            calculates an imaginary intersection point between the first and second pipes, wherein the lengths of the first pipe and second pipe are determined based on the imaginary intersection point; and
            identifies a kick as a first custom component based on the length and at least one attribute of the first selected system component, wherein identifying the kick includes comparing a maximum kick length against the lengths of the first pipe and second pipe; and
        displaying, within the GUI, the first custom component in place of the selected system components.

2. The system of claim 1, the stages further comprising:
    drawing, by the conversion module, a triangle within the GUI to illustrate the imaginary intersection point of the first and second pipes; and
    visually displaying dimensions of the triangle within the GUI.

3. The system of claim 1, the stages further comprising:
    coloring the first custom component differently than the system components in the GUI by applying filters to the system components and the first custom component.

4. The system of claim 1, the stages further comprising:
    generating a bill of materials in a custom dialog that includes the first custom component.

5. The system of claim 1, the stages further comprising:
    determining that the length of the first selected system component exceeds a maximum length of a pipe custom component; and
    displaying, in place of the first selected system component, a first pipe as the first custom component, a second pipe as a second custom component, and a connector between the first and second pipes as a third custom component.

6. A method of converting computer-aided design ("CAD") system components into custom components within a graphical user interface ("GUI"), comprising:
    receiving a selection of the system components in the GUI;
    executing a plugin that determines coordinates related to the selected system components in the GUI;
    receiving a command from a user that initiates a conversion module of the plugin, wherein the conversion module at least:
        determines a length and orientation of a first of the selected system components, wherein the system components include a first pipe, a bend, and a second pipe;
        calculates an imaginary intersection point between the first and second pipes, wherein the lengths of the first pipe and second pipe are determined based on the imaginary intersection point;
        identifies a kick as a first custom component based on the length and at least one attribute of the first selected system component, wherein identifying the kick includes comparing a maximum kick length against the lengths of the first pipe and second pipe; and
    displaying, within the GUI, the first custom component in place of the multiple selected system components.

7. The method of claim 6, further comprising:
    drawing, by the conversion module, a triangle within the GUI to illustrate the imaginary intersection point of the first and second pipes; and
    visually displaying dimensions of the triangle within the GUI.

8. The method of claim 6, further comprising:
    coloring the first custom component differently than the system components in the GUI by applying filters to the system components and the first custom component.

9. The method of claim 6, further comprising:
    generating a bill of materials in a custom dialog that includes the first custom component.

10. The method of claim 6, further comprising:
determining that the length of the first selected system component exceeds a maximum length of a pipe custom component; and
displaying, in place of the first selected system component, a first pipe as the first custom component, a second pipe as a second custom component, and a connector between the first and second pipes as a third custom component.

11. A non-transitory, computer-readable medium containing instructions for converting computer-aided design ("CAD") system components into custom components within a graphical user interface ("GUI"), the instructions causing a processor to execute stages comprising:
displaying the graphical user interface ("GUI") that allows a user to place the system components onto a screen;
running a plugin that determines coordinates related to selected system components in the GUI;
receiving a command from the user that initiates a conversion module of the plugin, wherein the conversion module at least:
determines a length and orientation of a first of the selected system components, wherein the system components include a first pipe, a bend, and a second pipe;
calculates an imaginary intersection point between the first and second pipes, wherein the lengths of the first pipe and second pipe are determined based on the imaginary intersection point;
identifies a kick as a first custom component based on the length and at least one attribute of the first selected system component, wherein identifying the kick includes comparing a maximum kick length against the lengths of the first pipe and second pipe; and
displaying, within the GUI, the first custom component in place of the selected system components.

12. The non-transitory, computer-readable medium of claim 11, the stages further comprising:
drawing, by the conversion module, a triangle within the GUI to illustrate the imaginary intersection point of the first and second pipes; and
visually displaying dimensions of the triangle within the GUI.

13. The non-transitory, computer-readable medium of claim 11, the stages further comprising:
coloring the first custom component differently than the system components in the GUI by applying filters to the system components and the first custom component.

14. The non-transitory, computer-readable medium of claim 11, the stages further comprising:
determining that the length of the first selected system component exceeds a maximum length of a pipe custom component; and
displaying, in place of the first selected system component, a first pipe as the first custom component, a second pipe as a second custom component, and a connector between the first and second pipes as a third custom component.

* * * * *